Figure 1:
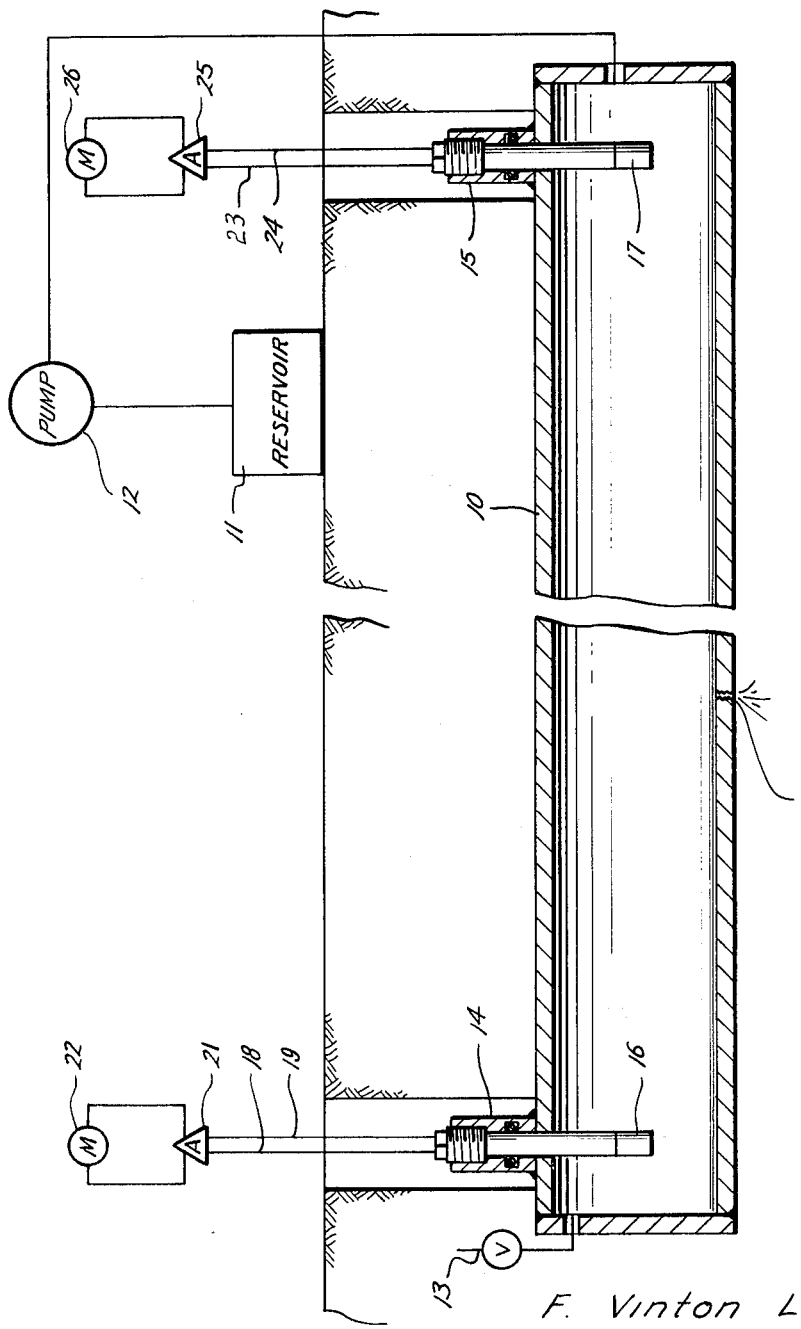

July 19, 1966   F. V. LONG   3,261,200
PIPELINE LEAK DETECTION METHOD
Filed Feb. 11, 1964   2 Sheets-Sheet 1

F. Vinton Long
INVENTOR.
BY
ATTORNEYS

Francis V. Long
INVENTOR.

3,261,200
PIPELINE LEAK DETECTION METHOD
Francis Vinton Long, Shreveport, La., assignor to Texas Eastern Transmission Corporation, Shreveport, La., a corporation of Delaware
Filed Feb. 11, 1964, Ser. No. 349,523
5 Claims. (Cl. 73—40.5)

This application is a continuation in part of my copending application Serial No. 114,110 for Pipeline Leak Detection Method, now abandoned.

This invention relates to pipelines, and more particularly to the location of leaks in pipelines.

The development of effective hydrostatic testing of new pipelines has proceeded far beyond the development of techniques to locate the occasional leaks discovered when the pipe is tested. For many years there has been a need for a simple technique which can be used under all field conditions and in good and bad weather, as well as difficult terrain.

In the past, two methods have been used to locate leaks; one, to walk the line and look for surface seepage; two, install manifolds and divide the line into shorter and shorter test sections, and, when the last test section becomes a reasonable length, strip the line and make a visual inspection.

The above procedures are slow, tedious and extremely expensive for the cost of installation of manifolds, final stripping of the last section of the line, and the loss of revenue time encountered, while many days are consumed in this search.

It is an object of this invention to provide a practical acoustical signal technique of detecting the position of a leak in a line under pressure.

Another object is to determine the approximate frequency of compression which will result from a leak in a given pipe and provide a system for detecting sound at said frequency.

Another object is to provide a method of determining the approximate position of a leak in a buried pipeline from compression sound waves generated by the leak.

Another object is to provide a method of determining the approximate position of a leak in a buried pipeline from compression sound waves generated by the leak and measured at widely spaced points in the pipeline to avoid the necessity of dividing lines into test sections and testing small sections.

Another object of this invention is to determine the frequency at which compression waves would be generated by a leak and measure signals at this frequency at widely spaced points in the pipeline and determining the distance of the leak from one of the measuring points by the following relationship: The relationship of the sum of two signals read to the distance between the two signal reading pionts is a function of one reading to the unknown distance from the leak to the point at which the other signal was read.

Other objects, features and advantages of the invention will be apparent from the specification, the claims and the drawings.

Figure 2:
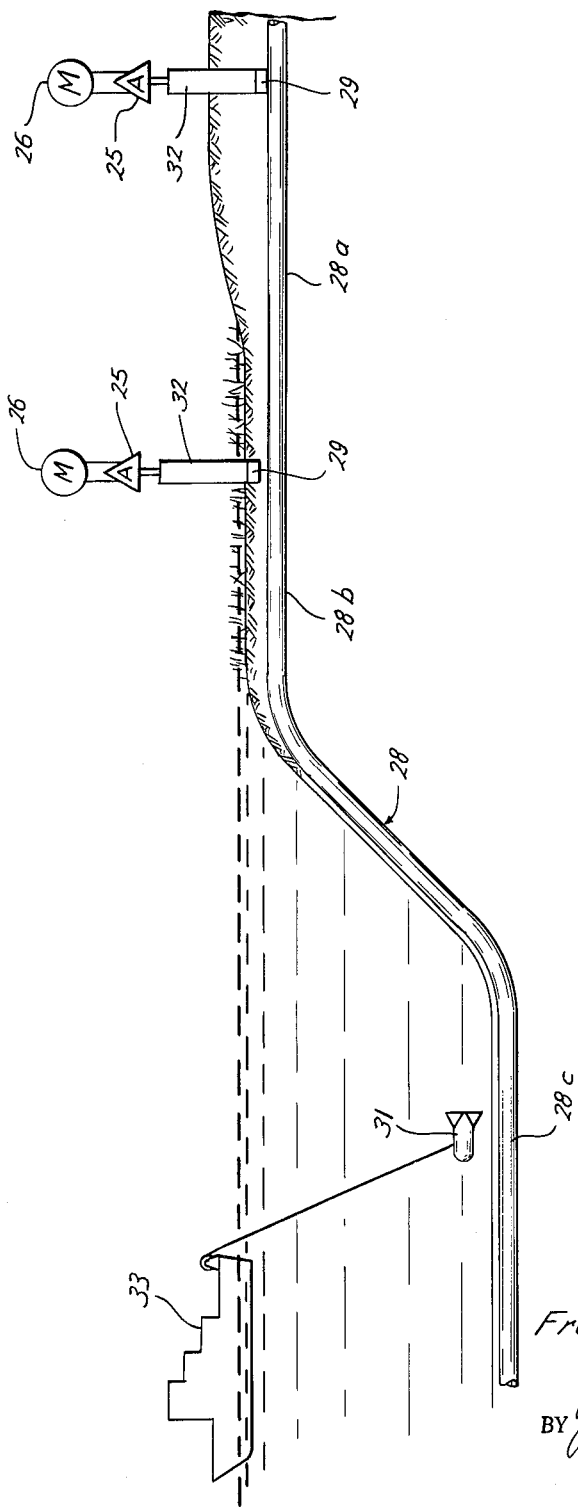

In the drawings, wherein like reference numerals indicate like parts;

FIGURE 1 is a view in section of a pipeline being tested in accordance with this invention; and, FIGURE 2 is a sectional view illustrating a section of a pipeline being tested in various types of terrain.

In the construction of cross-country pipelines of large diameter, it is customary to complete a substantial section of the line, say several miles, and then close off this section of the line, fill it with water and pressurize the line to a hydrostatic pressure on the order of 1,000 to 2,000 p.s.i. In FIGURE 1, the pipeline 10 may be assumed to be several miles long and to have been buried underground in the usual manner. Water from a suitable reservoir 11 is pumped into the pipe 10 by pump 12 and air exhausted from the line at the other end through valve 13 until the pipeline is substantially filled with water. Valve 13 is then closed and the line pressurized by pump 12 to a pressure on the order of 1,000 to 2,000 p.s.i. If a leak is present, the location of the leak can be determined in accordance with this invention by sensing the intensity of compression waves generated by the leak.

It has been found that two sound waves are generated by a leak in the wall of the pipe. One is the comparatively low frequency signal which is easily heard outside the pipe and detected from the outside surface of the pipe. The signal is usually in the 500 to 3,000 c.p.s. range. This low frequency signal is audible and consists of a hissing sound. The other type signal resulting from a high pressure leak is what may be referred to as the organ tube signal. It is known that a tube which is open at each end is resonant at a frequency such that the length of the tube is one-half wave length. If a pipe has a leak through its wall, the opening may be considered to be an organ tube. Thus, if we have a pipe whose wall thickness is .375 inch and the velocity of a compressional wave in water is 57,000 inches per second, then the frequency of the organ tube signal is $$f = V/2 \text{ wall thickness} = 57,000/.75 = 76 \text{ kc}$$

It has been found that this high frequency signal will be transmitted through the column of water inside the pipeline for a considerable distance with relatively low signal loss. It has further been found that the signal loss in traveling through the pipe is substantially a function of the distance traveled by the signal.

In accordance with one aspect of this invention, hydrophones of any desired type which are sensitive to the resonant frequency of the pipe are placed in the pipe at spaced points. Obviously these hydrophones might be placed in the pipe during construction or after construction in any desired manner, it only being necessary that they be positioned in the pipe at some time and that their position in the pipe along its length be known. Preferably, after it is discovered that a leak is present, hydrophones are placed in the pipe through the bosses 14 and 15. Conventional cutting equipment is well known for both securing the bosses 14 and 15 to the pipe and for inserting tools such as hydrophones 16 and 17 into the bosses and securing them therein. Leads 18 and 19 from the hydrophone 16 are connected to amplifier 21 and the signal from amplifier 21 is fed to the meter 22 which indicates in decibels the magnitude of the signal at the resonant frequency of the pipe at the point where the hydrophone 16 is positioned in the pipe.

In like manner, leads 23 and 24 from hydrophone 17 conduct the signal sensed at the point where hydrophone 17 is positioned in the pipe to amplifier 25. The amplified signal is then indicated by meter 26.

Preferably, the hydrophone is one selected to be very sensitive to signals of the frequency of the leak in the pipe and the amplifier 25 would preferably be designed to also be sensitive to the frequency of the compression waves generated by the leak in the pipe and relatively insensitive to other frequencies to eliminate as many antifacts as possible.

The distance between hydrophones 16 and 17 is measured and the sum of the readings of the meters 22 and 26 relative to this total distance is proportional to the relationship of one meter reading to the unknown distance from the other meter to the leak. Thus, if the reading of meter 22 is 70 db, the reading of meter 26 is 30 db, the distance between hydrophones 16 and 17 is two miles, and X equals the distance between the leak indicated at 27 and hydrophone 16, then 100/2 is equal to 30/X and X=.6 mile. Thus, the distance between leak 27 and hydrophone 16 is .6 mile. After this determination is made, the .6 of a mile from hydrophone 16 is measured off and the backfill removed from over the pipe to permit visual location of the leak 27 and repair thereof.

After the leak has been repaired and the line retested, if desired the hydrophones may be removed and plugs inserted in bosses 14 and 15 to permit their reuse at a later date. If desired, the hydrophones may be left in place as expendable items.

Referring now to FIGURE 2, the pipe indicated generally at 28 is shown to have a portion 28a in relatively dry ground, a portion 28b in wet, marshly land, and a portion 28c resting on the floor of a body of water. In this figure the invention is illustrated with transducers utilized outside of the pipe to detect leaks in the pipe. Again, the transducers 29 and 31 are preferably designed to be sensitive to the frequency of the compression waves generated by the leak in the pipe and relatively insensitive to other frequencies to eliminate as many antifacts as possible. Again, the frequency of the wave is determined by the organ-tube effect of the leak through the wall of the pipe, in accordance with the formula given above.

As fluid passes through a leak in the pipe, the compression waves are generated both internally and externally of the pipe, and, of course, will be present in the pipe wall itself. In this form of the invention, the transducers 29 are designed to pick up these external compression waves and the sound waves in the pipe itself. Where the pipe is above the water table, it is preferred that the transducer be in contact with the pipe. It is preferred that the transducer contact the pipe because air and soil are not good conductors and attenuate the ultrasonic frequency waves. However, it is not necessary that the transducer be in contact with the pipe, particularly where the transducer is close to the leak.

As water is an excellent conductor of compression waves, it is contemplated that the transducer may be placed adjacent the pipe and the surrounding area flooded to provide a path for conducting sound.

The transducer 29 is carried on a probe 32. It is preferred that another instrument, not shown, be used to punch a hole in the ground into which the probe 32 which carries the transducer is inserted.

The signal from the transducer 29 is fed to the tuned amplifier 25, as hereinabove explained, and the signal sensed is read on meter 26.

The transducer 29 may be sensing the escape of either a gas or a liquid from the pipe 28. While it is customary to test new lines with an incompressible fluid such as water, they may be tested with a compressible fluid such as gas. The compression waves created by either escaping water or gas from pipe 28 may be sensed by the transducer 29. In like manner, it should be noted that the system shown in FIGURE 1 may be utilized to sense waves created by escaping gas with transducers located internally of the pipe, because the compression waves will travel down the wall of the pipe and also will travel internally of the pipe. It is preferred, however, that where the transducers are located internally of a pipe that the test be carried out with an incompressible fluid such as water.

Where the pipe is charged with methane gas, the velocity of a compressional wave in the gas will be 17,000 inches per second. Using a pipe wall of .375 in., the frequency may be determined as follows:

$F = V/2$ wall thickness $= 17,000/.75 = 22,666$ or 22.7 kc.

It will be appreciated that an escaping fluid, whether it be compressible or incompressible, will cause a readily detectable wave where the pipe is below the water table or beneath the surface of a body of water. This is true because water is incompressible and the compression waves from the leak will pass through the water about the exterior of the pipe. As the attenuation of these waves is relatively small, the transducer may be located at a relatively greater distance from the pipe than in the case where no water is present. Thus, while it is preferred to have the transducer in contact with the pipe in dry soil, this is not necessary where the pipe is surrounded by water, as the water will make an excellent couple between the pipe and transducer. This is illustrated by the transducer of FIGURE 2 located in the marshy land and being spaced from the pipe.

When the pipe is resting on the bed of a body of water, the transducer 31 may be towed behind a boat 33. Of course, the tuned amplifier 25 and meter 26 will be located in the boat so that the operator may determine the presence or absence and intensity of the frequencies received.

It will be apparent that in the use of the transducers receiving a compression wave from the pipe wall or from the exterior of the pipe, that the operator will move the transducer along the pipe until the transducer picks up acoustical waves at substantially the resonant frequencies of the organ tube effect established by the thickness of the pipe wall. The transducer will then be moved along the pipe to determine the direction in which the signal increases. Continued movement of the transducer towards the leak will result in an increased signal until the leak is passed, when a decrease in signal will be noted. In this manner, the location of the leak is determined.

From the above, it will be seen that by designing the pickup apparatus to be sensitive to the resonant frequencies of the pipe as determined by the organ-tube formula, that the equipment will pick up waves which are caused by the leak in the pipe. As the equipment is designed to pick up this frequency, it will tend to exclude other frequencies, thus greatly increasing the sensitivity of the system. While the waves created by the leak in the pipe are best transmitted through an incompressible medium, they will be transmitted to a lesser extent through a compressible medium, and thus the system may be used in testing a pipe containing either a compressible or incompressible medium under pressure. As the waves created by the leak are also transmitted down the pipe itself, these waves may be picked up by a transducer positioned exteriorly of the pipe. Where the pipe is surrounded by water, the waves traveling through this water are more readily sensed than is the case when the pipe is not covered by an incompressible medium. This feature is of great advantage when the pipe is beneath the body of water, as the transducer may be towed along the pipe from a boat.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:
1. The method of locating a leak in a pipeline comprising:
   closing the pipeline at both ends,
   filling the pipeline with water under pressure,
   determining the resonant frequency of an open tube having a length equal to the pipe wall thickness,
   sensing at widely spaced points in the pipeline any compression waves at approximately said determined resonant frequency resulting from a leak in the wall of the pipeline with instruments sensitive to approximately said resonant frequency,
   measuring the amplitude of such compression waves sensed at spaced points,
   and comparing the amplitude of compression waves measured to determine the relative position of a leak from each sensing point.

2. The method of locating a leak in a pipeline comprising:
   closing the pipeline at both ends, filling the pipeline with an incompressible fluid under pressure, determining the resonant frequency of an open tube having a length equal to the pipe wall thickness, and sensing at widely spaced points in the pipeline any compression waves at approximately said determined resonant frequency resulting from a leak in the wall of the pipeline with instruments sensitive to approximately said resonant frequency, measuring the amplitude of such compression waves sensed at spaced points, and comparing the amplitude of compression waves measured to determine the relative position of a leak from each sensing point.

3. The method of locating a leak in a pipeline comprising, filling the pipeline with a fluid under pressure to cause said fluid to escape through a leak in the pipeline, determining the resonant frequency of an open tube having a length equal to the pipe wall thickness, and sensing the compression waves resulting from said escaping fluid at approximately said determined resonant frequency with instruments sensitive to approximately said resonant frequency and relatively insensitive to other frequencies.

4. The method of locating a leak in a pipeline comprising, filling the pipeline with a fluid under pressure to cause said fluid to escape through a leak in the pipeline, determining the resonant frequency of an open tube having a length equal to the pipe wall thickness, and sensing the compression waves resulting from said escaping fluid at approximately said determined resonant frequency with instruments sensitive to approximately said resonant frequency and relatively insensitive to other frequencies and located exteriorly of the pipe.

5. The method of locating a leak in an underwater pipeline comprising, filling the pipeline with a fluid under pressure to cause said fluid to escape through a leak in the pipeline, determining the resonant frequency of an open tube having a length equal to the pipe wall thickness, and sensing the compression waves resulting from said escaping fluid at approximately said determined resonant frequency with instruments sensitive to approximately said resonant frequency and relatively insensitive to other frequencies and moving through the body of water adjacent the pipeline.

References Cited by the Examiner

UNITED STATES PATENTS

| | | | |
|---|---|---|---|
| 882,141 | 3/1908 | Cope | 73—40.5 X |
| 3,000,205 | 9/1961 | Suderow | 73—40.5 X |
| 3,028,450 | 4/1962 | Manning | 73—40.5 X |
| 3,055,209 | 9/1962 | Reid et al. | 73—40.5 X |

LOUIS R. PRINCE, *Primary Examiner.*

D. M. YASICH, *Assistant Examiner.*